United States Patent
Fukuda et al.

(10) Patent No.: US 6,546,300 B1
(45) Date of Patent: Apr. 8, 2003

(54) PRODUCTION/MANUFACTURING PLANNING SYSTEM

(75) Inventors: Etsuo Fukuda, Yokohama (JP); Shinichi Hohkibara, Tokyo-To (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/455,380

(22) Filed: Dec. 6, 1999

(30) Foreign Application Priority Data

Dec. 8, 1998 (JP) .......................................... 10-348608

(51) Int. Cl.[7] ........................... G06F 19/00; G06F 17/60
(52) U.S. Cl. ............................. 700/100; 700/97; 705/8
(58) Field of Search ...................... 700/95–97, 99–104; 705/8

(56) References Cited

U.S. PATENT DOCUMENTS

| | | | |
|---|---|---|---|
| 4,827,423 A | * | 5/1989 | Beasley et al. ............... 700/96 |
| 5,280,425 A | * | 1/1994 | Hogge ........................ 712/300 |
| 5,586,021 A | * | 12/1996 | Fargher et al. ............. 700/100 |
| 6,195,590 B1 | * | 2/2001 | Powell ........................ 700/36 |
| 6,240,331 B1 | * | 5/2001 | Yun ........................... 700/121 |
| 6,356,797 B1 | * | 3/2002 | Hsieh et al. ................. 700/101 |
| 6,438,436 B1 | * | 8/2002 | Hohkibara et al. ........... 700/97 |

FOREIGN PATENT DOCUMENTS

| | | |
|---|---|---|
| JP | 11-170144 | 6/1999 |
| JP | 11-235648 | 8/1999 |

* cited by examiner

*Primary Examiner*—Leo Picard
*Assistant Examiner*—Paul Rodriguez
(74) *Attorney, Agent, or Firm*—Oblon, Spivak, McClelland, Maier & Neustadt, P.C.

(57) ABSTRACT

A production/manufacturing planning system is provided with a production planning planner 10 and a manufacturing planning scheduler 12. The production planning planner 10 makes the production planning for the whole factory, and the manufacturing planing sheduler 12 makes the manufacturing planning schedule for each of manufacturing lines on the basis of the production planning for the whole factory. Thus, it is possible to more precisely make the production planning and manufacturing planning than that in conventional systems.

10 Claims, 7 Drawing Sheets

PRODUCTION/MANUFACTURING PLANNING SYSTEM

BACKGROUND OF THE INVENTION

1. Field of the Invention

The present invention relates generally to a production/manufacturing planning system. More specifically, the invention relates to a production/manufacturing planning system for use in a factory, such as a semiconductor manufacturing factory, which has a plurality of manufacturing lines, each of which has a plurality of processes.

2. Description of the Background Art

The features of a conventional production/manufacturing planning system are known as follows. That is, conventional production planning for the whole factory having a plurality of manufacturing lines (the planning for the input/delivery quantities into/from a plurality of manufacturing lines) is usually made on the basis of past records, e.g., a mean term of works, a mean operation rate, a mean number of lots processed per equipment, and a mean number of lots batch-processed per equipment. This is the same in the case of commercially available software tools, such as Pacemaker and Rhythm.

Figure 13:
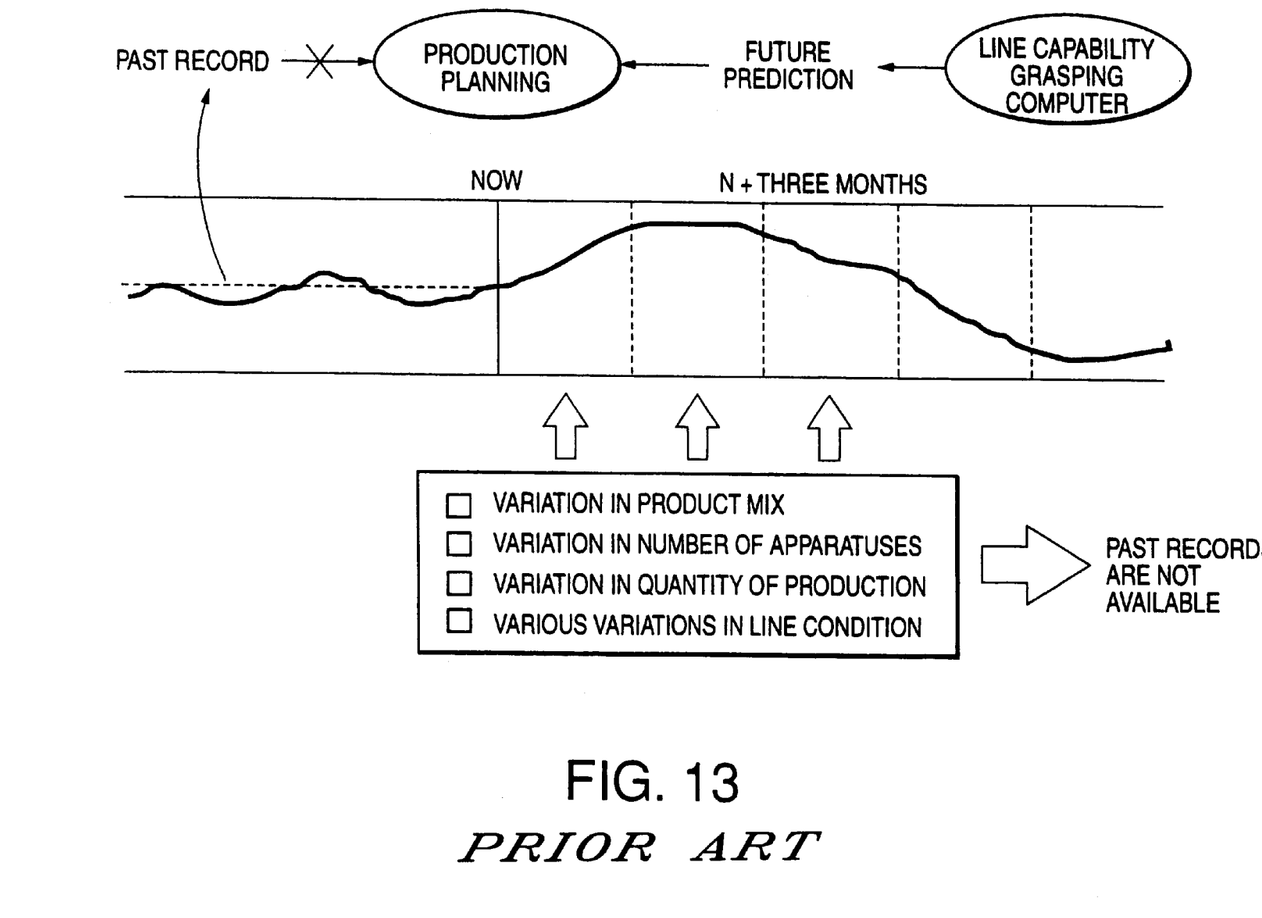
FIG. 13 is a schematic diagram for explaining problems when the production planning for the whole factory and the manufacturing planning for each manufacturing line are made by a conventional system.

However, as shown in FIG. 13, in the case of such a conventional method for predicting the future on the basis of past records, if a future product mix or the like is changed, planning is upset. Therefore, in order to predict the future, predicting the future change in product mix, at least to some extent is required.

In addition, conventional production planning for the whole factory is calculated with deteriorated precision in view of the processing capacity of the system. This is because the amount of data concerning all of the plurality of manufacturing lines (a wide range), all of the products in different processes including pretreatment and after-treatment processes (multiple products amounting to thousands of kinds), and the need for long term planning extending over periods of from three months to six months (a long term range) is enormous and exceeds the processing capacity of the system. For this reason, only data concerning "numerical quantities" serving as final numerical values, such as scheduled quantities of input and delivery into/from each of the manufacturing lines, is normally outputted as future prediction data. However, when progress management is carried out for every product (every lot) in all of the manufacturing lines, the "numerical quantities" serving as numerical values do not have sufficient precision, so that the precision of production planning suffers.

Moreover, other factors upsetting conventional planning include external disturbances, such as a variation in quantity of production (requests for an increase and decrease, etc.), and internal disturbances inside of the manufacturing lines, such as the equipment being down, variation in yield, and an abnormality in the associated process. Even if an alarm is given when internal disturbances on the inside of the manufacturing lines occur, it is not always true that such an alarm is needed. That is, it is not always the case that when equipment goes down that there is a decrease in quantity of production. For that reason, conventional production planning cannot cope with internal disturbances such as equipment going down. Thus, conventional planning does not treat internal disturbances in the manufacturing lines adequately when performing production planning for the whole factory.

As can be seen from the foregoing, it is not possible to sufficiently precisely perform conventional production planning and manufacturing planning since the function of performing production planning for the whole factory has been separated from the function of performing manufacturing planning for each of manufacturing lines. In addition, when internal disturbances and/or external disturbances occur in the manufacturing lines, conventional planning cannot determine whether these disturbances have a bad interference on production planning for the whole factory.

SUMMARY OF THE INVENTION

It is therefore an object of the present invention to eliminate the aforementioned problems and to provide a production/manufacturing planning system capable of performing production planning for the whole factory and of performing manufacturing planning for each manufacturing line to sufficiently precisely perform production planning and manufacturing planning.

It is another object of the present invention to provide a production/manufacturing planning system capable of easily grasping whether internal and/or external manufacturing line disturbances will have a bad influence on production planning for the whole factory.

In order to accomplish the aforementioned and other objects, according to one aspect of the present invention, a production/manufacturing planning system comprises: a production planner for performing production planning for the whole factory and outputting a planning result; and a manufacturing scheduler for providing individual manufacturing line planning schedules for each kind of product being produced by each of the manufacturing lines on the basis of the planning result outputted from the production planner.

According to another aspect of the present invention, a production/manufacturing planning system comprises: a production planner for performing production planning for the whole factory on the basis of information concerning a process capability indicative of a manufacturing capacity of each of the manufacturing lines, and outputting a planning result; a manufacturing scheduler for making a manufacturing planning schedule for each of the kinds of products produced by each of the manufacturing lines on the basis of the planning result outputted from the production planner; a line capability grasping simulator for simulating a delivery quantity being a quantity of products produced by each of the manufacturing lines, to provide simulated result data for predicting a future delivery quantity of each of the products, and to provide information concerning the process capability indicative of the manufacturing capacity of each of the manufacturing lines; a process control system for controlling the progress of a plurality of processes in each of the manufacturing lines, to provide historical information data, which is, for each manufacturing line, past record data for each of the products produced by that manufacturing line; and a scheduled past record control system for determining whether it is likely that a shortage of a delivery quantity with respect to the manufacturing planning schedule will occur in the future, using the historical information data of the process control system and the simulated result data of the line capability grasping simulator.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

The present invention mainly has the following three features. The first feature is that when the production planning for the whole factory and the manufacturing planning for each of the manufacturing lines belonging to the factory are made, the production planning for the whole factory and the manufacturing planning for each of manufacturing lines are made by two stages. The second feature is that the scheduled past record control for giving an alarm or warning is carried out on the basis of the difference between the planning thus made and the past record to be feed back to the next production planning for the whole factory. The third feature is that a line capability grasping simulator is used when the production planning for the whole factory and the manufacturing planning for each manufacturing line are made and when the scheduled past records are grasped. That is, the present invention is characterized in that a production planning planner, a manufacturing planning scheduler, past records data, and a simulator are combined to precisely perform production planning and manufacturing planning.

Referring now to the accompanying drawings, a preferred embodiment of the present invention will be described below.

Figure 1:
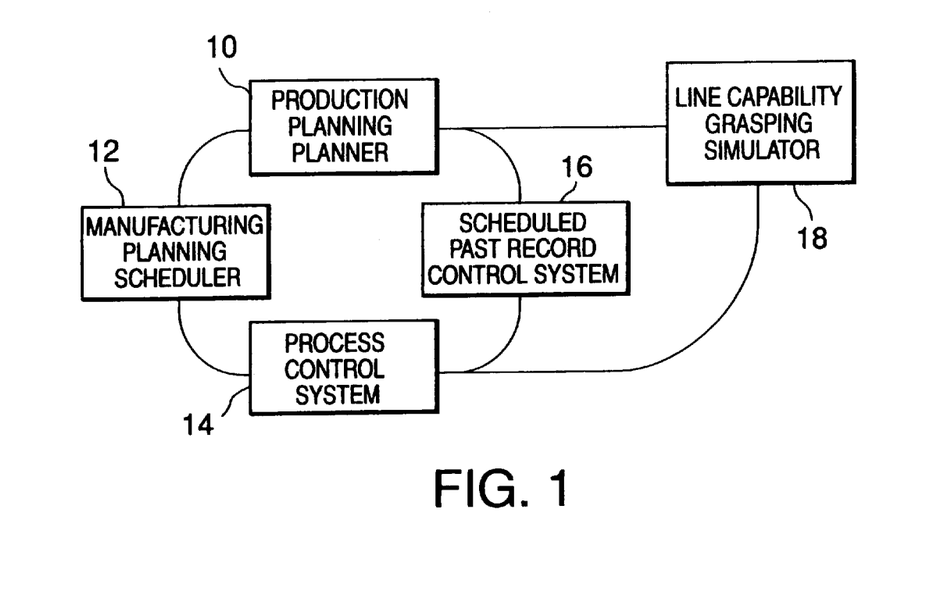
FIG. 1 is a block diagram showing the whole construction of a preferred emit of a production/manufacturing planning system according to the present invention.

FIG. 1 is a functional block diagram of a preferred embodiment of a production/manufacturing planning system according to the present invention. As shown in FIG. 1, the preferred embodiment of a production/manufacturing panning system comprises a production planning planner 10, a manufacturing planning scheduler 12, a process control system 14, a scheduled past record control system, and a line capability grasping simulator 18.

First, the functions of these elements will be schematically described. The production planning planner 10 has the function of performing production planning for the whole factory. The manufacturing planning scheduler 12 has the function of performing manufacturing planning for each of a plurality of manufacturing lines existing in the factory. In each of the manufacturing lines used for processing semiconductor devices, a plurality of processes are provided. The process control system 14 is a system existing in each of the manufacturing lines that functions to control the process progress of products in each of the manufacturing lines. The scheduled past record control system 16 manly has the function of controlling the relationship between the scheduled delivery quantity and the past record of delivery quantity for every process.

Figure 2:
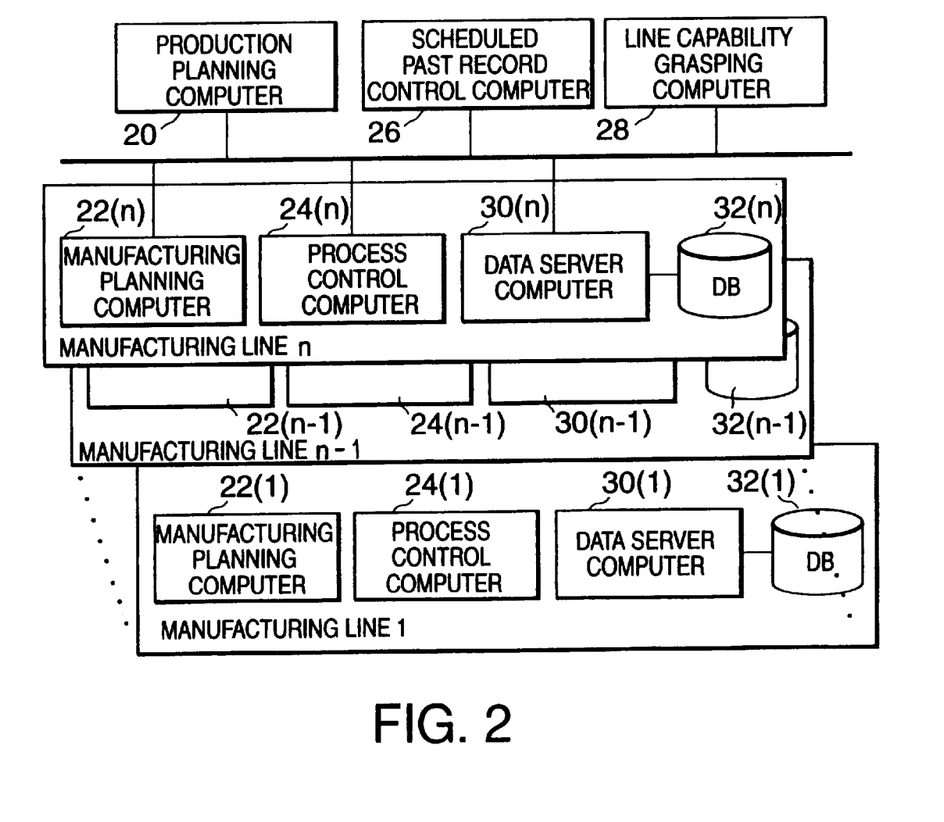
FIG. 2 is a schematic diagram showing an example of a hardware construction of a preferred embodiment of a production/manufacturing planning system according to the present invention.

Referring to FIG. 2, an example of a hardware construction of the preferred embodiment of a production/manufacturing panning system according to the present invention will be described below. Furthermore, the hard construction shown in FIG. 2 is only an example, and varies in accordance with the performance of a computer. In this preferred embodiment, the respective functions shown in FIG. 1 are realized by independent computers.

The manufacturing planning scheduler 12 in FIG. 1 is realized by a manufacturing planning computer 22 shown in FIG. 2. The process control system 14 in FIG. 1 is realized by a process control computer 24 shown in FIG. 2. In this preferred embodiment, a manufacturing planning computer 22 and a process control computer 24 are provided for each of the manufacturing lines. That is, a manufacturing planning computer 22(l) and a process control computer 24(l) are provided for a manufacturing line 1, and a manufacturing planning computer 22(n) and a process control computer 24(n) are provided for a manufacturing line 25 n.

The production planning planner 10 in FIG. 1 is realized by a production planning computer 20 shown in FIG. 2. The scheduled past record control system 16 in FIG. 1 is realized by a scheduled past record control computer 26 shown in FIG. 2. The line capability grasping simulator 18 in FIG. 1 is realized by a line capability grasping computer 28 shown in FIG. 2. In this preferred embodiment, the production planning computer 20, the scheduled past record control computer 26, and the line capability grasping computer 28 are provided for the whole system by ones.

In this preferred embodiment, data server computers 30 for storing calculated results and information concerning the history of the process progress of lots are also provided. Each of the data server computers 30 is provided for a corresponding one of the manufacturing lines. That is, a data server computer 30(l) is provided for the manufacturing line 1, and a data server computer 30(n) is provided for the manufacturing line n. Each of the data server computers 30 is connected to a data base 32.

Furthermore, the data server computer 30 and the data base 32 do not have to be provided for each line. That is, the manufacturing planning computer 22 and the process control computer 24 may be each independently equipped with a data base.

In the preferred embodiment of a production/manufacturing planning system according to the present invention, the functions of the production planning planner 10, the manufacturing planning scheduler 12, the process control system 14, the scheduled past record control system 16 and the line capability grasping simulator 18 will be described in detail below.

(Production Planning Planner)

As described above, the production planning planner 10 shown in FIG. 1 is realized by the production planning computer 20 shown in FIG. 2, and has the function of performing production planning for the whole factory. The term production planning means scheduling input dates and delivery dates for all of the products in the factory. This production planning may include information concerning scheduled dates when the products are to pass through each of the processes between input and delivery.

Figure 3:
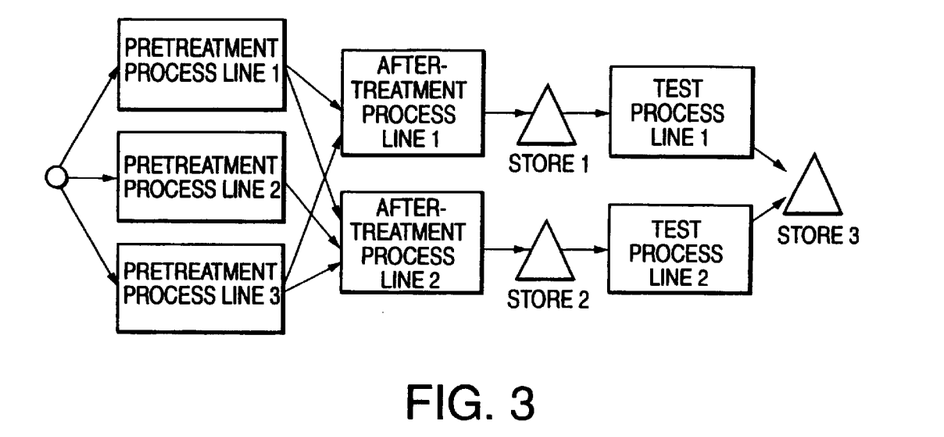
FIG. 3 is a block diagram showing an example of the whole construction of a semiconductor manufacturing factory.

FIG. 3 is a schematic diagram showing the whole construction of a semiconductor manufacturing factory. As shown in FIG. 3, a typical semiconductor manufacturing factory comprises a plurality of pretreatment process lines, a plurality of after-treatment process lines, a plurality of test process lines, and a plurality of stores (temporary product storage).

In the production planning for the whole factory, an input date and a delivery date for each kind of product in the whole factory are calculated to provide the schedule of production for the whole factory. As part of such a system for performing production planning for the whole factory, there are commercially available software planning tools, such as Pacemaker, commercially available from Paragon, and Rhythm, commercially available from i2, although this preferred embodiment should not be considered to be limited to these software tools. The production planning tool of this preferred embodiment means a tool capable of calculating input dates and scheduled delivery dates for all of the products in the factory, and should not be considered to be limited to a particular planning tool.

(Manufacturing Planning Schedule)

The manufacturing planning scheduler 12 shown in FIG. 1 is realized by the manufacturing planning computer 22 shown in FIG. 2, and has the function of performing manufacturing planning for one of manufacturing lines. Each of the manufacturing lines has a plurality of processes. Therefore, a manufacturing planning schedule means the process progress schedule for all of the products in a certain manufacturing line (when each of the products is processed and when the processing thereof is completed for every process in that manufacturing line).

As shown in FIG. 2, a manufacturing planning computer 22 is provided for each of the manufacturing lines in the preferred embodiment. In the example of the construction of the factory and manufacturing lines shown in FIG. 3, the manufacturing planning computer 22 (the manufacturing planning scheduler 12) exists in each of the pretreatment process line 1, the pretreatment process line 2, . . . , and the test process line 2.

As such a system for performing manufacturing planning for each of the manufacturing lines, there are commercially available schedulers, such as ManSim, commercially available from Manugistics, and AutoSched, commercially available from Autosimulation, although this preferred embodiment is not limited to these tools. The manufacturing planning scheduler 12 of this preferred embodiment has the function of making the process progress schedule for each of the processes with respect to all of products in the manufacturing lines.

A method for linking the production planning planner 10 for performing production planning for the whole factory to the manufacturing planning scheduler 12 for performing manufacturing planning for each of the manufacturing lines will be described later. One of the features of this preferred embodiment is that the manufacturing planning for each of the manufacturing lines and the production planning for the whole factory are combined.

(Process Control System)

The process control system 14 shown in FIG. 1 is realized by the process control computer 24 shown in FIG. 2, and has the function of carrying out the process progress management for products for every manufacturing line. Although the process control computer 24 has various functions, only functions necessary to realize this preferred embodiment will be described below.

As shown in FIG. 2, the process control computer 24 in this preferred embodiment is provided for each of the manufacturing lines. That is, in the example of the construction of the factory and manufacturing lines in FIG. 3, the process control computer 24 (the process control system 14) exists in each of the pretreatment process line 1, the pretreatment process line 2, . . . , and the test process line 2.

As shown in FIG. 2, the process control computer 24 causes process flow information, which describes how a product passes through a process and what conditions allow the product to be processed, to be stored in the data base 32 via the data server computer 30. In each of the manufacturing lines, the products are processed on the basis of the process flow information.

In addition, the process control computer 24 has the function of writing historical information data indicating when the processing has been started and completed in the data base 32 to control the historical information data. That is, the process control computer 24 causes the actual processing start time and actual processing finish time for each of products (lots) in each of the processes to be described in the data base 32.

Figure 4:
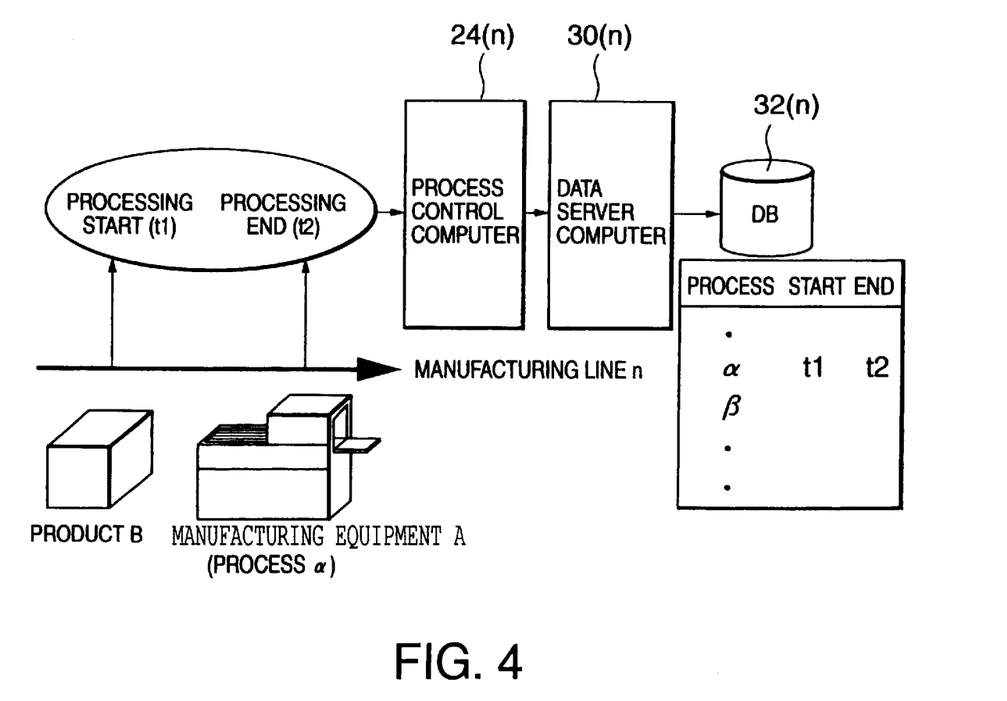
FIG. 4 is a schematic diagram showing the state that a process control computer controls historical information data.

FIG. 4 is a schematic diagram showing the state that the process control computer 24 controls the historical information data. As shown in FIG. 4, it is assumed that a manufacturing equipment A for carrying out a process α is provided in a certain line n as one manufacturing equipment. It is also assumed that the input time for a product B entering into the manufacturing equipment A to start processing is time t1, and that the time processing is terminated is time t2. Then, the process control computer 24(n) acquires the time t1 for the processing of the product B in the process a to have been started, and that the time t2 for the processing to have been terminated, and stores the times t1 and t2 in the data base 32(n) via the data server computer 30(n). The process control computer 24(n) repeats such operation for each process α β, . . . . This is an example of the operation of the process control computer 24 for providing the historical information data.

Since the process control computer 24 provide the historical information data, the process control computer 24 also describes a processing start time of the first process in the manufacturing line and a processing finish time of the final process, as part of that historical information data. The process control computer 24 also describes the processing start time of the first process in a process flow, and the processing finish time of the final process in the process flow. Therefore, it can be recognized when the product has been inputted into the actual manufacturing line, when the final process has been finished, and when the product has been delivered from the actual manufacturing line. In addition, the process control computer 24 can calculate the delivery quantity in each of the manufacturing lines every day, every week or every month by counting the number of the delivered products.

Figure 5:
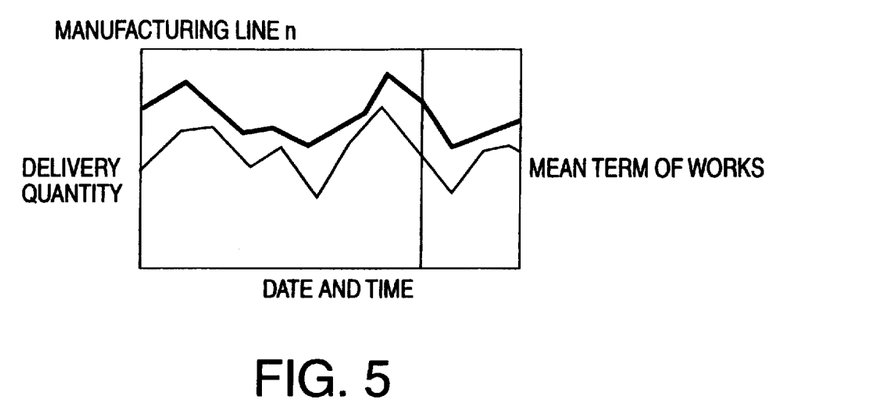
FIG. 5 is a graph showing the relationships between the delivery quantity and the date and time and between the mean term of works and the date and time in a certain manufacturing line.
Figure 6:
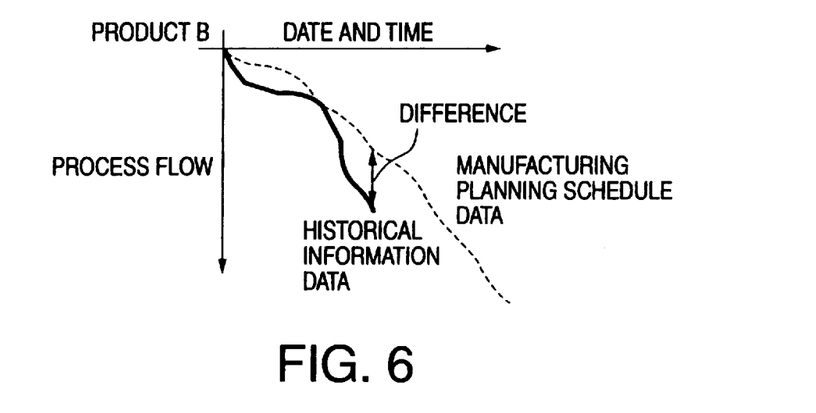
FIG. 6 is a graph showing historical information data and manufacturing planning schedule data in the relationship between the process flow and the date and time for a certain product.

FIG. 5 is a graph showing an example of the relationships between the delivered quantity and the date and time in the manufacturing line n and between the mean term of works and the date and time. FIG. 6 is a graph showing an example of the relationship between the process flow and the date and time for the product B. These graphs shown in FIGS. 5 and 6 can be described on the basis of the processing start time t1 and the processing finish time t2 which are provided by the process control computer 24.

In addition, if the scheduled processing start time and processing finish time of each product in each process, which have been scheduled by the manufacturing planning computer 22, are compared with the processing start time t1 and processing finish time t2 as past records of each product in each process, which have been stored in the process control computer 24 as historical information data, the advance or lag of each product in each process from the manufacturing planning can be recognized. That is, the difference between the schedule and the past record can be grasped for every process in each manufacturing line. Similarly, the difference between the actual delivery quantity and the scheduled delivery quantity in each manufacturing line can be grasped.

(Scheduled Past Record Control System)

The scheduled past record control system 16 shown in FIG. 1 is realized by the scheduled past record control computer 26 shown in FIG. 2. This scheduled past record control computer 26 has the function of controlling the relationship between the scheduled delivery quantity and the past record of delivery quantity in each manufacturing line.

In addition, the scheduled past record control computer 26 also acquires the simulated result data calculated by the line capability grasping simulator 18, which will be described in detail below, via the data server computer 30. That is, the line capability grasping simulator 18 changes certain parameters, e.g., an MTBF (a mean time between failure), an MTTR (a mean time to repair), a product mix and a precedence ratio, to carry out a plurality of line capability simulations to acquire a plurality of simulated result data. The plurality of simulated result data include a plurality of future progress schedules for each product in each process, a plurality of future delivery schedules in each manufacturing line, and so forth. If the scheduled past record control system 16 acquires the simulated result data, together with the past record data, it is possible to realize a warning function, which will be described later.

The warning function of the scheduled past record control system 16 is the function of giving an alarm for every manufacturing line when the difference between the past record data and the simulated result data is greater than a predetermined value. This alarm urges the operator, the production planning planner 10, or the like, to change a certain parameter, e.g., the precedence, input quantity or input data of products.

Figure 7:
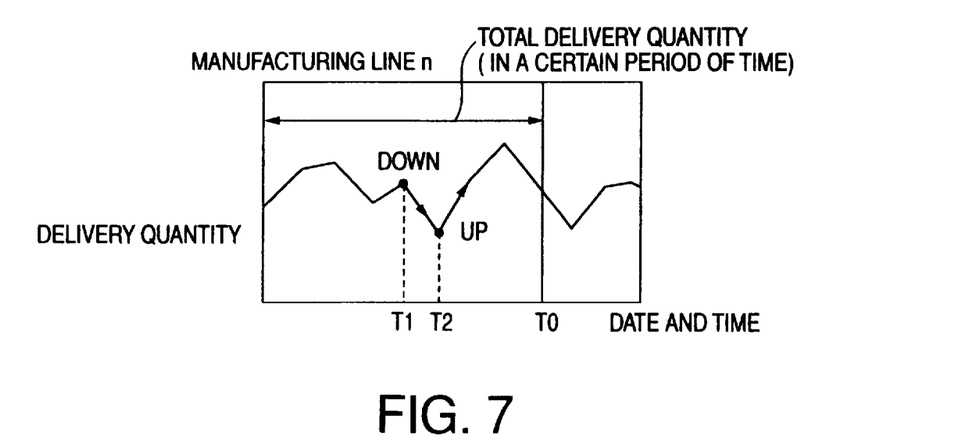
FIG. 7 is a graph showing the relationship between the delivery quantity and the date and time for a certain product in a certain manufacturing line.

As shown in FIGS. 6 and 7, it is difficult to predict whether problems, such as a shortage of delivery quantity, will occur in the future, by using only historical information data acquired from each manufacturing line and provided by the process control computer. As shown in the example of FIG. 6, it is difficult to determine how the difference between the schedule and the past record causes the problem of the process progress for the lot. In addition, as shown in the example of FIG. 7, the delivery quantity always varies up and down. Even if the delivery quantity tends to fall at a certain point (time T1), it tends to rise at another point (time T2), so that there is no problem of a shortage of delivery quantity if the total delivery quantity for each month is satisfied.

Figure 8:
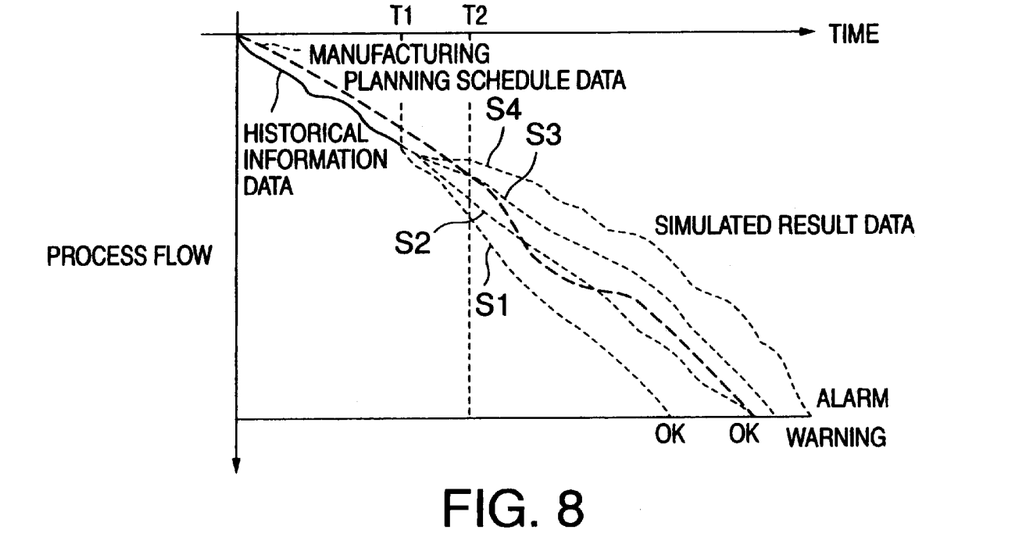
FIG. 8 is a graph showing the relationship between the process flow and the time for a certain product in a certain manufacturing line, with respect to manufacturing planning schedule data, historical information data and simulated result data.
Figure 9:
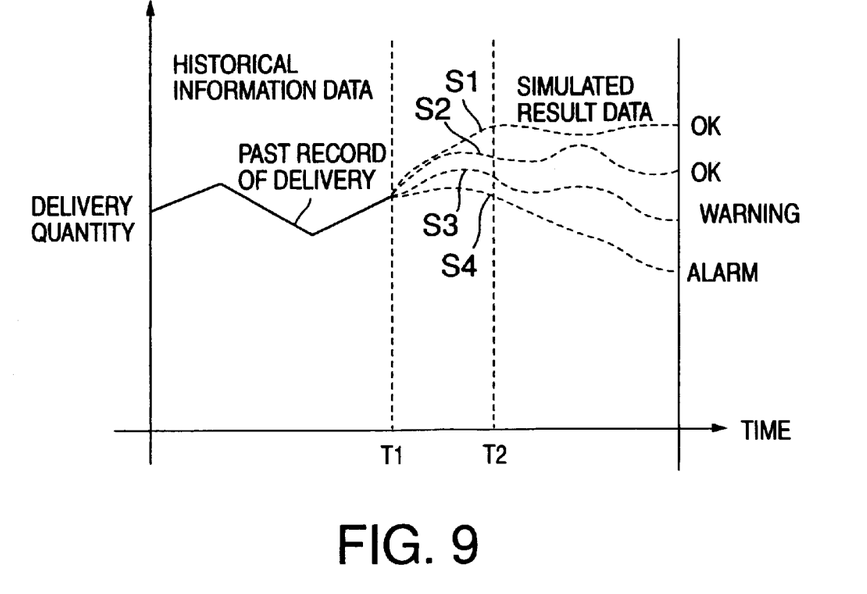
FIG. 9 is a graph showing the relationship between the delivery quantity and the time for a certain product in a certain manufacturing line, with respect to historical information data and simulated result data.

In order to solve such a problem, the scheduled past record control system 16 has a warning function. FIGS. 8 and 9 are graphs for explaining the warning function in this preferred embodiment. FIG. 8 is a graph showing the relationship between the process flow of a certain product and time, and FIG. 9 is a graph showing the relationship between the delivery quantity of a certain product and time.

The graph of FIG. 8 shows four kinds of simulated results for a certain product from a certain time T1. The four kinds of simulated results can be obtained by changing same parameters to carry out simulations using the line capability grasping simulator 18. That is, the graph of FIG. 8 shows four process progress schedules. Similarly, the graph of FIG. 9 shows four kinds of simulated results for delivery schedules from time T1.

When the time is changed from time T1 to time T2 in FIGS. 8 and 9, whether the present state has a level for causing a problem in the future or not is determined by where the past record data level at time T2 is compared to the level of the simulated results S1, S2, S3 and S4, also at time T2.

For example, when the past record data at time T2 have a value of about S1 or S2 in FIG. 8, the simulation data indicates that there will be no problem in the future. Therefore, it is not required to give an alarm to call an operators attention or the like, and it is not required to indicate the change of the production planning to the production planning planner 10. However, when the past record data at time T2 have a value of about S3, there is some possibility of causing a shortage (of the delivery quantity or delivery date) by about 10% in the future based on the simulation data. Therefore, it is required to give a warning to call an operators attention, or the like, or it is required to indicate the change of the production planning to the production planning planner 10. Moreover, when the past record data at time T2 have a value of about S4, it can be clearly seen that it is not possible to ensure a target value in the future based on the simulation data. Therefore, it is required to give an alarm to issue a warning to the operator, or the like, or it is required to indicate the change of the production planning to the production planning planner 10. Thus, the production/manufacturing planning system in this preferred embodiment also has the function of predicting future problems in manufacturing lines on the basis of the past record data and the simulated result data.

The scheduled past record control computer 26 also has the function of requesting a change of precedence, input quantity, or the like, of a product to the production planning computer 20 with respect to a product or manufacturing line having caused the alarm or warning. The production planning computer 20 having received this request changes the precedence, input quantity, or the like, to perform current production planning. That is, the production planning computer 20 performs production planning again on the basis of the indication from the scheduled past record control computer 26. Then, the current production planning for the whole factory is fed back to the manufacturing planning computer 22 for each manufacturing line.

Figure 10:
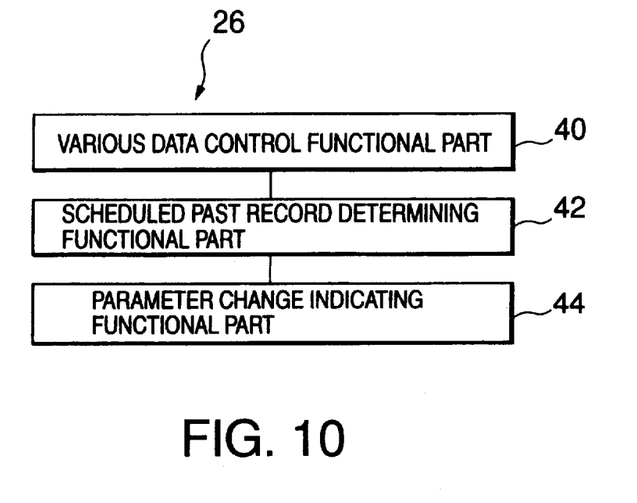
FIG. 10 is a block diagram showing the construction of a scheduled past record control computer.

FIG. 10 is a block diagram showing the above described functions of the scheduled past record control computer 26. As shown in FIG. 10, the scheduled past record control computer 26 comprises a various data control functional part 40, a scheduled past record determining functional part 42, and a parameter change indicating functional part 44. The various data control functional part 40 has the function of controlling manufacturing planning schedule data in the manufacturing planning computer 22, historical information data in the process control computer 24, and simulated result data in the line capability grasping simulator 18.

The scheduled past record determining functional part 42 has the function of comparing the manufacturing planning schedule data, the historical information data, and the simulated result data with each other to determine whether the problem of the shortage of delivery quantity for a product will occur in the future. The parameter change indicating functional part 44 has the function of indicating the change of parameters in the production planning for the whole factory to the production planning computer 20 when it is determined by the scheduled past record determining functional part 42 that it is required to give an alarm or warning.

Figure 11:
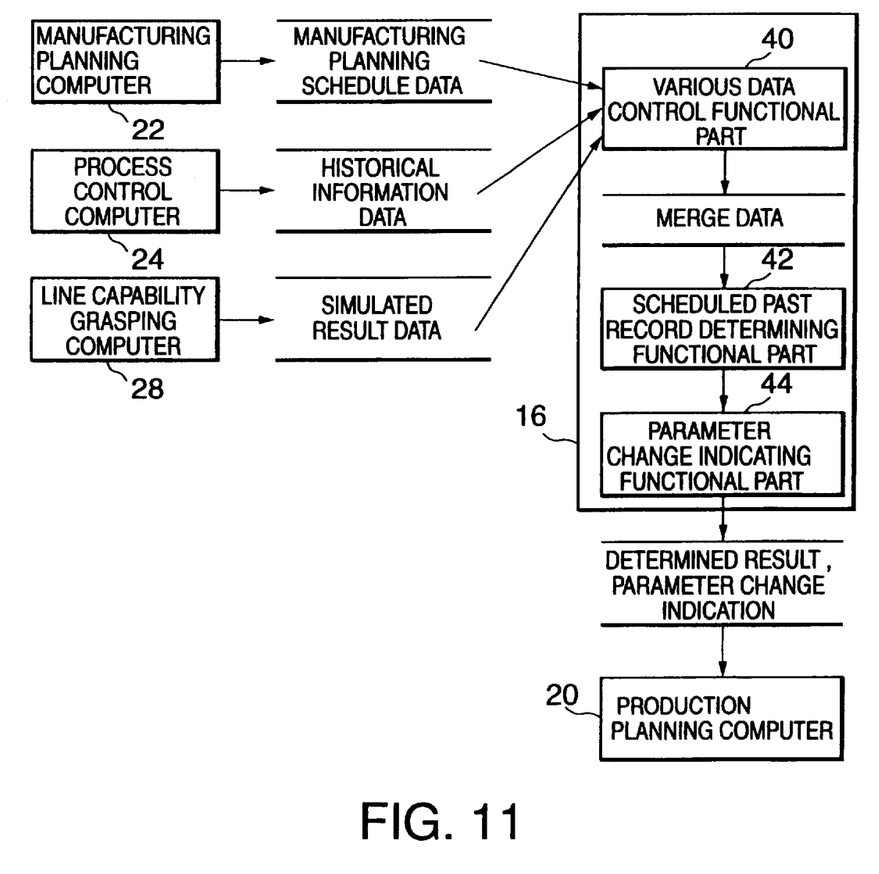
FIG. 11 is a schematic diagram showing a data flow in a scheduled past record control computer.

FIG. 11 is a data flow diagram illustrating data flow in the scheduled past record control computer 26. As shown in FIG. 11, the various data control functional part 40 in the scheduled past record control computer 26 acquires the manufacturing planning schedule data from the manufacturing planning computer 22, the historical information data from the process control computer 24, and the simulated result data from the line capability grasping computer 28. Then, the various data control functional part 40 merges all of the data to generate merged data. The scheduled past record determining functional part 42 acquires the merged data to compare the historical information data with the simulated result data to estimate the future. This estimated result is compared with the manufacturing planning schedule data. When there is some predetermined probability of a problem arising, such as the shortage of a future delivery quantity, the determined result for giving an alarm or warning is outputted. Thus, in the case of the determined result required for giving an alarm or warning, the parameter change indicating functional part 44 outputs an indication of the change of a parameter.

(Line Capability Grasping Simulator)

The line capability grasping simulator 18 shown in FIG. 1 is realized by the line capability grasping computer 28 shown in FIG. 2, and has the function of changing the product mix, the precedence ratio, the number of apparatuses, the value of MTBF/MTTR, and so forth, to simulate the delivery quantity in each manufacturing line. Similar to the above described manufacturing planning scheduler 12, it is possible to utilize an existing software tool, such as commercially available ManSim or AutoSched. The simulated result data obtained by a simulation using the line capability grasping computer 28 is outputted to the production planning computer 20 and the scheduled past record control computer 26 as described above. That is, part of the simulated result data (data concerning the schedule for each product, the predicted delivery quantity, and so forth) are delivered to the scheduled past record control computer 26 via the data server computer 30, and part of the simulated result data (the process capability, and so forth) are delivered to the production planning computer 20.

(Whole Data Flow)

Figure 12:
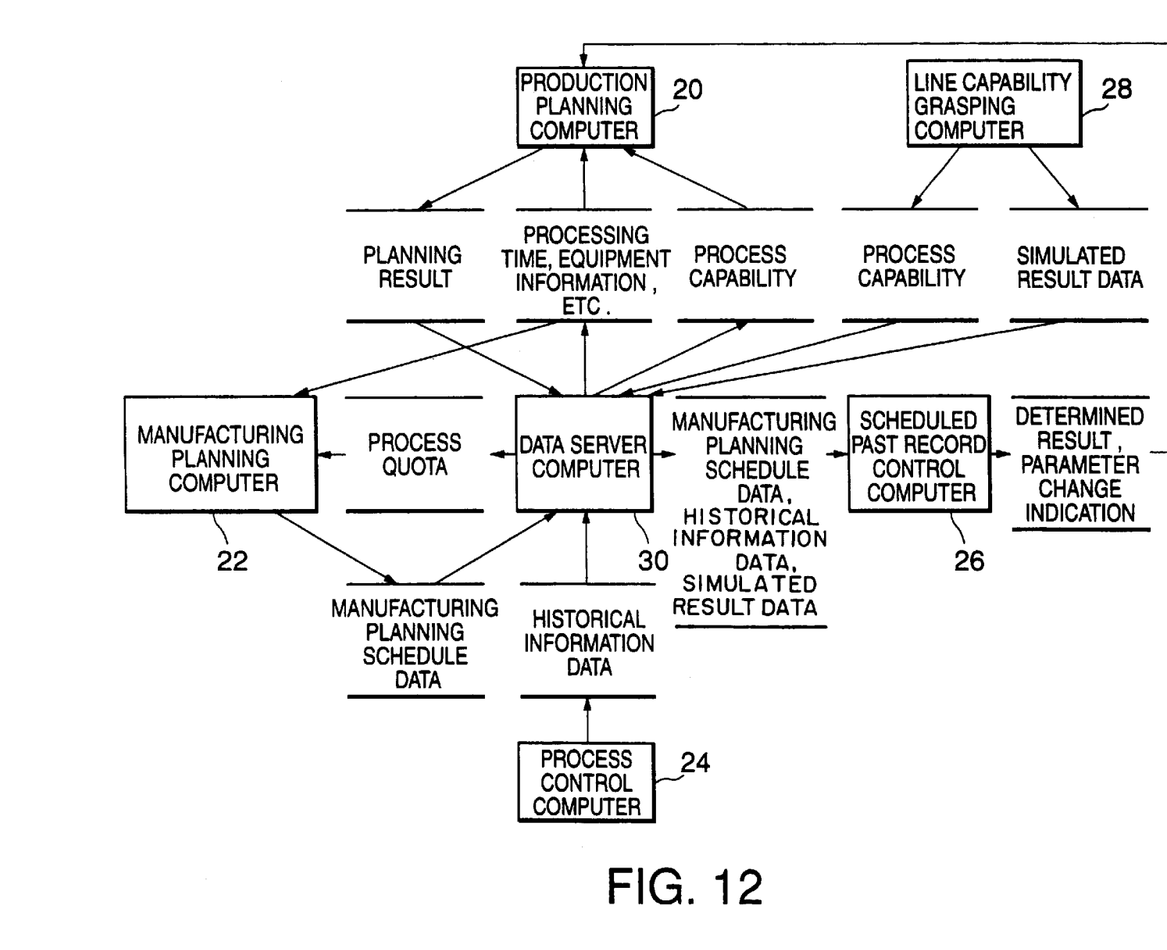
FIG. 12 is a schematic diagram showing the whole data flow for a preferred embodiment of a production/manufacturing planning system according to the present invention.

Referring to FIG. 12, the flow of data in this preferred embodiment will be described below. As shown in FIG. 12, the production planning computer 20 acquires information necessary for performing the production planning for the whole factory from the data server computer 30. The acquired information includes, e.g., a processing time and equipment information. In addition, the production planning computer 20 acquires information concerning the process capability indicative of the manufacturing capacity of each manufacturing line calculated by the line capability grasping computer 28 from the data server computer 30. The information concerning the process capability includes, e.g., the mean number of batch lots of a batch processing unit, and the number of lots processed by the unit per time.

The production planning computer 20 prepares the production planning for the whole factory using the information acquired from the data server computer 30. The planning results serving as the production planning prepared by the production planning computer 20 are stored in the data server computer 30.

Similar to the production planning computer 20, the manufacturing planning computer 22 provided for each manufacturing line acquires information necessary for scheduling (the processing time, the equipment information, etc.), from the data server computer 30. Then, the manufacturing planning computer 22 provided for each manufacturing line makes a schedule for each manufacturing line in accordance with the planning results prepared by the production planning computer 20.

In this case, the planning results prepared by the production planning computer 20 are expressed as process quotas for each process. The process quotas include the kind of product and the number of lots, which are processed in a certain time zone serving as a certain process, and the processing order attached to each process for products, which has been prepared by the production planning computer 20. The manufacturing planning computer 22 acquires such planning results serving as the process quotas from the data server computer 30. This data is utilized as (dispatch order) information for determining the order of processing when the manufacturing planning computer 22 carries out the scheduling.

The manufacturing planning schedule data serving as the scheduling results prepared by the manufacturing planning computer 22 are stored in the data server computer 30 and utilized as information when products are processed. The operator can refer to this information by using a personal computer, or the like, existing in a clean room for the manufacturing line.

As described above, the historical information data serving as the past records of processes in each manufacturing line is outputted from the process control computer 24 to the data server computer 30 and stored in the data server computer 30.

The scheduled past record control computer 26 realizes the above described warning function using the manufacturing planning schedule data prepared by the manufacturing planning computer 22, the historical information data obtained by the process control computer 24, and the simulated result data calculated by the line capability grasping computer 28. In addition, the scheduled past record control computer 26 determines whether it is required to review particular parameters in performing the production planning for the whole factory. The determined results and the indication of any change of the particular parameters are delivered to the production planning computer 20, and this data is reflected in re-planning. The particular parameters changed by any indication of the change include, e.g., the precedence of a certain product and the input quantity of a certain kind.

The production planning computer 20 changes these particular parameters to reperform production planning for the whole factory. The remade planning results are stored in the data server computer 30, and then, the flow returns to the above described serial flow.

As described above, the production/manufacturing planning system in this preferred embodiment is divided into two hierarchies, one being the function of performing the production planning for the whole factory and the other being the function of performing the manufacturing planning for each manufacturing line, so that it is possible to improve planning precision. The production/manufacturing planning system is provided with the production planning planner 10 and the manufacturing planning scheduler 12. The production planning planner 10 performs production planning for the whole factory, and the manufacturing planning scheduler 12 makes the manufacturing planning schedule for each manufacturing line on the basis of the production planning for the whole factory. Thus, production planning and manufacturing planning can be performed more precisely than conventional production planning and manufacturing planning.

In addition, since the production planning planner 10 is linked with the line capability grasping simulator 18, it is possible to make a plan in view of future change, not just the conventional prediction based on past records. That is, since the production planning planner 10 performs production planning for the whole factory on the basis of the process capability indicative of the future manufacturing capacity of each manufacturing line calculated by the line capability grasping simulator 18, production planning taking the prediction of any future change into consideration can be performed.

Moreover, since the excess and shortage of the delivery quantity of the product are determined using historical information data serving as the past record data controlled by the process control system 14 and the simulated results calculated by the line capability grasping simulator 18, it is possible to suitably determine whether any problem relating to the delivery quantity of products in each manufacturing line will occur in the future. Therefore, it is possible to suitably determine whether the variation due to any internal disturbance in a certain manufacturing line will have a bad influence on the production planning for the whole factory. In addition, when it is likely that the shortage of the delivery quantity in a certain manufacturing line will have a bad influence on the production planning for the whole factory, the production planning for the whole factory is indicated from the scheduled past record control system 16 to the production planning planner 10, so that it is possible to cause a variation in a certain manufacturing line to be reflected in the next performed production planning. Therefore, it is possible to precisely predict future production planning for the whole factory.

Furthermore, the present invention should not be limited to the above described preferred embodiment, and the invention can be embodied in various ways. For example, while the data base 32 has been provided in each manufacturing line in this preferred embodiment as shown in FIG. 2, a common data base may be provided for the whole system. In addition, while four kinds of simulated result data have been indicated in the graphs of FIGS. 8 and 9, the number of kinds of simulated result data should not be considered to be limited thereto, as any number of kinds of simulated result data may be indicated. Moreover, while data exchange has been carried out via the data server computer 30 in this preferred embodiment as shown in FIG. 12, any necessary data exchange may be carried out directly between the production planning computer 20, the manufacturing planning computer 22, the process control computer 24, the scheduled past record control computer 26, and the line capability grasping computer 28.

In addition, while the system has been applied to production/manufacturing planning for a semiconductor manufacturing factory in this preferred embodiment, the system may be applied to any other kind of factory having a plurality of manufacturing lines, each of which has a plurality of processes.

As described above, since the production planning planner for performing production planning for the whole factory and the manufacturing planning scheduler for performing manufacturing planning for each manufacturing line are provided in the production/manufacturing planning system according to the present invention, it is possible to precisely perform production planning for the whole factory and to perform manufacturing planning for each manufacturing line.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A production/manufacturing planning system comprising:

a production planner configured to output a planning result after performing production planning for a whole factory having a plurality of manufacturing lines that are configured to produce a plurality of kinds of products;

a manufacturing scheduler configured to provide, at least in part based on said planning result outputted from said production planner, a manufacturing planning schedule relative to each of the manufacturing lines for each kind or product being produced by each of the manufacturing lines, said manufacturing scheduler being provided in each of said manufacturing lines;

a line capability grasping simulator configured to simulate product delivery quantities as quantities of products produced by each of said manufacturing lines and to provide simulated result data for predicting future product delivery quantities;

a process control system configured to control the progress of a plurality of processes being preformed in each of said manufacturing lines and to provide, for each manufacturing line, historical information data including past record data for each of said products produced by each of said manufacturing lines, said process control system being provided in each of said manufacturing lines, and a scheduled past record control system configured to determine whether it is likely that there will be a probable future failure of any of the manufacturing lines to process and deliver planned quantities of products with respect to said manufacturing planning schedule and to give an alarm when the scheduled past record control system determines it is likely that the probable future failure will actually occur and to provide a change of a parameter being used to perform production planning for the whole factory to said production planner when the alarm is given so as to prevent said probable future failure from actually occurring, the scheduled past record control system determination being at least in part based on said historical information data of said process control system and said simulated result data of said line capability grasping simulator.

2. The production/manufacturing planning system as set forth in claim 1, wherein said planning result, said manufacturing planning schedule, said historical information data, and said simulated result data are stored in a data server computer provided for each of said manufacturing lines.

3. The production/manufacturing planning system as set forth in claim 2, wherein said process control system is configured to count said data server computer to store therein a processing start time and a processing finish time as part of said historical information data.

4. The production/manufacturing planning system as set forth in claim 3, wherein said process control system is configured to count the number of delivered products as part of said historical information data and to store the counted number of delivered products in said data server computer.

5. The production/manufacturing planning system as set forth in claim 4, wherein said production planner is configured to acquire process capability information indicative of a manufacturing capacity of each of said manufacturing lines from said line capability grasping simulator and to perform production planning for the whole factory on the basis of said process capability information.

6. A production/manufacturing planning system comprising:

a production planner configured to output a planning result after performing production planning for a whole factory having a plurality of manufacturing lines that are configured to produce a plurality of kinds of products, said production planning being at least in part based on process capability information indicative of a manufacturing capacity of each of said manufacturing lines;

a manufacturing scheduler configured to provide, at least in part based on said planning result outputted from said production planner, a manufacturing planning schedule relative to each of the manufacturing lines for each kind or product being produced by each of the manufacturing lines, said manufacturing scheduler being provided in each of said manufacturing lines; a line capability grasping simulator configured to simulate product delivery quantities as quantities of products produced by each of said manufacturing lines and to provide simulated result data for predicting future delivery quantities and said process capability information indicative of said manufacturing capacity of each of said manufacturing lines;

a process control system configured to control the progress of a plurality of processes being preformed in each of said manufacturing lines and to provide, for each manufacturing line, historical information data including past record data for each of said products produced by each of said manufacturing lines, said process control system being provided in each of said manufacturing lines, and a scheduled past record control system configured to determine whether it is likely that there will be a probable future failure of any of the manufacturing lines to process and deliver planned quantities of products with respect to said manufacturing planning schedule and to give an alarm when the scheduled past record control system determines it is likely that the probable future failure will actually occur and to provide a change of a parameter being used to perform production planning for the whole factory to said production planner when the alarm is given so as to prevent said probable future failure from actually occurring, the scheduled past record control system determination being at least in part based on said historical information data of said process control system and said simulated result data of said line capability grasping simulator.

7. The production/manufacturing planning system as set forth in claim 6, wherein said planning result, said manufacturing planning schedule, said historical information data, and said simulated result data are stored in a data server computer provided for each of said manufacturing lines.

8. The production/manufacturing planning system as set forth in claim 7, wherein said process control system is configured to cause said data server computer to store therein a processing start time and a processing finish time as part of said historical information data.

9. The production/manufacturing planning system as set forth in claim 8, wherein said process control system is configured to count the number of delivered products as part of said historical information data and to store the counted number of delivered products in said data server computer.

10. The production/manufacturing planning system as set forth in claim 9, wherein said production planner is configured to acquire said capability information from said line capability grasping simulator.

* * * * *